(12) United States Patent
Kim

(10) Patent No.: US 8,902,126 B2
(45) Date of Patent: Dec. 2, 2014

(54) COLOR CORRECTING APPARATUS AND METHOD FOR COLOR MATCH BETWEEN STEREOSCOPIC DISPLAY DEVICES

(75) Inventor: Jin Seo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 209 days.

(21) Appl. No.: 13/615,466

(22) Filed: Sep. 13, 2012

(65) Prior Publication Data

US 2013/0154903 A1    Jun. 20, 2013

(30) Foreign Application Priority Data

Dec. 14, 2011    (KR) .......................... 10-2011-0134962

(51) Int. Cl.
*G09G 5/00*    (2006.01)

(52) U.S. Cl.
USPC .............................. 345/1.1; 345/590; 345/622

(58) Field of Classification Search
USPC .............................. 345/1.1–3.4, 581, 590, 622
See application file for complete search history.

(56) References Cited

U.S. PATENT DOCUMENTS

| | | | |
|---|---|---|---|
| 5,579,031 A * | 11/1996 | Liang | 345/604 |
| 6,317,903 B1 | 11/2001 | Brunelle et al. | |
| 7,869,619 B2 | 1/2011 | Herbert et al. | |
| 2005/0146734 A1 * | 7/2005 | Stokes et al. | 358/1.9 |
| 2006/0071937 A1 | 4/2006 | Tin | |

FOREIGN PATENT DOCUMENTS

KR    1020080109601 A    12/2008

OTHER PUBLICATIONS

Yang-Ho Cho et al., "Inverse Characterization Method of Alternate Gain-Offset-Gamma Model for Accurate Color Reproduction in Display Device", Journal of Imaging Science and Technology, 2006, pp. 139-148, vol. 50 No. 2, Society for Imaging Science and Technology.

* cited by examiner

*Primary Examiner* — Premal Patel

(57) ABSTRACT

The present disclosure relates to a color correcting method of a display device. A color correcting apparatus includes an input unit configured to receive an input image; an output unit configured to connect the color correcting apparatus with a reference sterosopic display device and a target stereoscopic display device; a user input unit configured to receive feedback data based on the difference in colors of the reference stereoscopic display device and the target stereoscopic display device; and a processor configured to convert colors of the input image using color profiles of the reference stereoscopic display device and the target stereoscopic display device and correct the colors of the target stereoscopic display device based on the feedback data to be consistent with the colors of the reference stereoscopic display device.

8 Claims, 4 Drawing Sheets

COLOR CORRECTING APPARATUS AND METHOD FOR COLOR MATCH BETWEEN STEREOSCOPIC DISPLAY DEVICES

CROSS-REFERENCE TO RELATED APPLICATIONS

This application is based on and claims priority from Korean Patent Application No. 10-2011-0134962, filed on Dec. 14, 2011, with the Korean Intellectual Property Office, the disclosure of which is incorporated herein in its entirety by reference.

TECHNICAL FIELD

The present disclosure relates to a color correcting method of a display device, and more particularly, to a color correcting apparatus and method for color match between stereoscopic display devices that corrects colors of a stereoscopic display device using color reproduction characteristic information of stereoscopic display devices and human visual system in order to maintain color match between multiple stereoscopic display devices.

BACKGROUND

Generally, different kinds of display devices use different materials and methods in order to generate images. Therefore, colors of the images which are reproduced by input signals RGB (0 to 255) or YCbCr (brightness signal Y ranges from 0 to 1 and color difference signals Cb and Cr range from −0.5 to 0.5) are different in the devices even though the input signals are equal to each other.

The color matching technology of the related art generates color profiles of display devices through a color characterization process and matches the colors through the mapping process using the color profiles. The color characterization process of the display device obtains output colors for the input signal as data type of standard color space (CIEXYZ or CIELAB) using a color spectrophotometer, and modeling the relationships between input and output signals using the data. The input signal is converted into a standard color space using either a characterizing process of an image input device or a predetermined conversion model between color spaces (sRGB or Adobe RGB).

A volume of the color space in which an imaging device can reproduce in the standard color space is referred to as a color gamut. Since a color reproducing method is different in individual devices, sizes and shapes of the color gamuts are accordingly different from each other. Therefore, in order to reproduce the color which can be reproduced as it is by an input device in an output device, a color gamut mapping process is required. Compressing, clipping and mapping technologies for two color gamuts of the input device and the output device allow the reproduction of the same or very similar color.

The color matching technology between display devices in the related art generally uses characterization of the display devices and a color gamut mapping technology in order to minimize the color difference in the standard color space. However, this may be achieved only if it is possible to exactly quantify how much human visual system perceive actual colors of the image. In the case of the stereoscopic display device, different images are input to left and right eyes and composited by a human visual system that makes an image stereoscopic. In other words, different from the two-dimensional image in the related art, two different images are input simultaneously. As a result, color difference may happen between reproduced image in the case of a measurement based color matching technology.

SUMMARY

The present disclosure has been made in an effort to provide a color correcting apparatus and method for color match between stereoscopic display devices that corrects colors using human visual system which is capable of compensating for the problems that occur due to a color measurement.

An exemplary embodiment of the present disclosure provides a color correcting apparatus for color match between stereoscopic display devices, including: an input unit configured to receive an input image; an output unit configured to connect the color correcting apparatus with a reference sterosopic display device and a target stereoscopic display device; a user input unit configured to receive feedback data based on the difference in colors of the reference stereoscopic display device and the target stereoscopic display device; and a processor configured to convert colors of the input image using color profiles of the reference stereoscopic display device and the target stereoscopic display device, and correct the colors of the target stereoscopic display device based on the feedback data to be consistent with the colors of the reference stereoscopic display device.

Another exemplary embodiment of the present disclosure provides a color correcting method for color match between stereoscopic display devices, including: converting colors of an input image using color profiles of a reference stereoscopic display device and a target stereoscopic display device; receiving feedback data based on the difference in colors of the reference stereoscopic display device and the target stereoscopic display device to which the color-converted input images are output; checking the color match between the reference stereoscopic display device and the target stereoscopic display device based on the feedback data; correcting the colors of the target stereoscopic display device based on the feedback data if the colors of the reference stereoscopic display device are not consistent with the colors of the target stereoscopic display device.

A color correcting apparatus and method for color match between stereoscopic display devices according to exemplary embodiments of the present disclosure corrects colors reproduced in the stereoscopic display device using color profiles (color reproduction characteristic information) of the stereoscopic display devices and human visual system in order to maintain color consistency between multiple stereoscopic display devices, which allows the color consistency between multiple stereoscopic display devices.

The foregoing summary is illustrative only and is not intended to be in any way limiting. In addition to the illustrative aspects, exemplary embodiments, and features described above, further aspects, exemplary embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Figure 1:
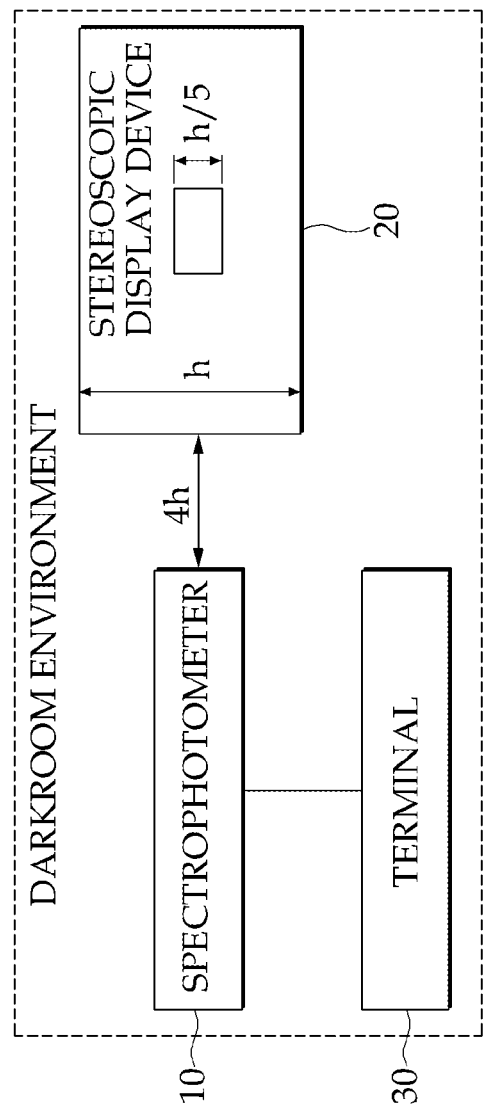
FIG. 1 is a configuration diagram schematically illustrating a color measuring system of a stereoscopic display device according to an exemplary embodiment of the present disclosure.

FIG. 1 is a configuration diagram schematically illustrating a color measuring system of a stereoscopic display device according to an exemplary embodiment of the present disclosure.

Referring to FIG. 1, the color measuring system of a stereoscopic display device includes a spectrophotometer 10, a stereoscopic display device 20, and a terminal 30.

The spectrophotometer 10, the stereoscopic display device 20, and also the terminal 30 are provided in a darkroom and the spectrophotometer 10 is connected to the terminal 30 to perform data communication.

The spectrophotometer 10 is a device that physically measures colors and measures color reproduction characteristics of the stereoscopic display device 20 using a spectro-colorimetric method.

The stereoscopic display device 20 generates a color patch for measuring the color reproduction characteristics to be displayed on a screen. The color patch generated by sampling an input signal range (for example, in the case of an RGB signal, 0 to 255 for every channel (Red, Green, and Blue) of the stereoscopic display device 20 to be used as a signal for every channel or a combination of the sample signals for every channel. The size of the color patch is one fifth of the height h of the screen of the stereoscopic display device 20 and a distance between the spectrophotometer 10 and the stereoscopic display device 20 is four times the height h of the screen.

The spectrophotometer 10 outputs measured data (colorimetric value) with respect to the color patch which is displayed onto the screen of the stereoscopic display device 20 to the terminal 30. The measured data is a value on either a CIEXYZ color space or a CIELAB color space.

The terminal 30 receives the measured data (calorimetric value) for the color patch from the spectrophotometer 10 through wired or wireless communication with the spectrophotometer 10. The terminal 30 allows a storage unit (not illustrated) to store the measurement data as a color profile of the stereoscopic display device 20. The color profile is used when the color correction of the stereoscopic display device 20 are performed.

Figure 2:
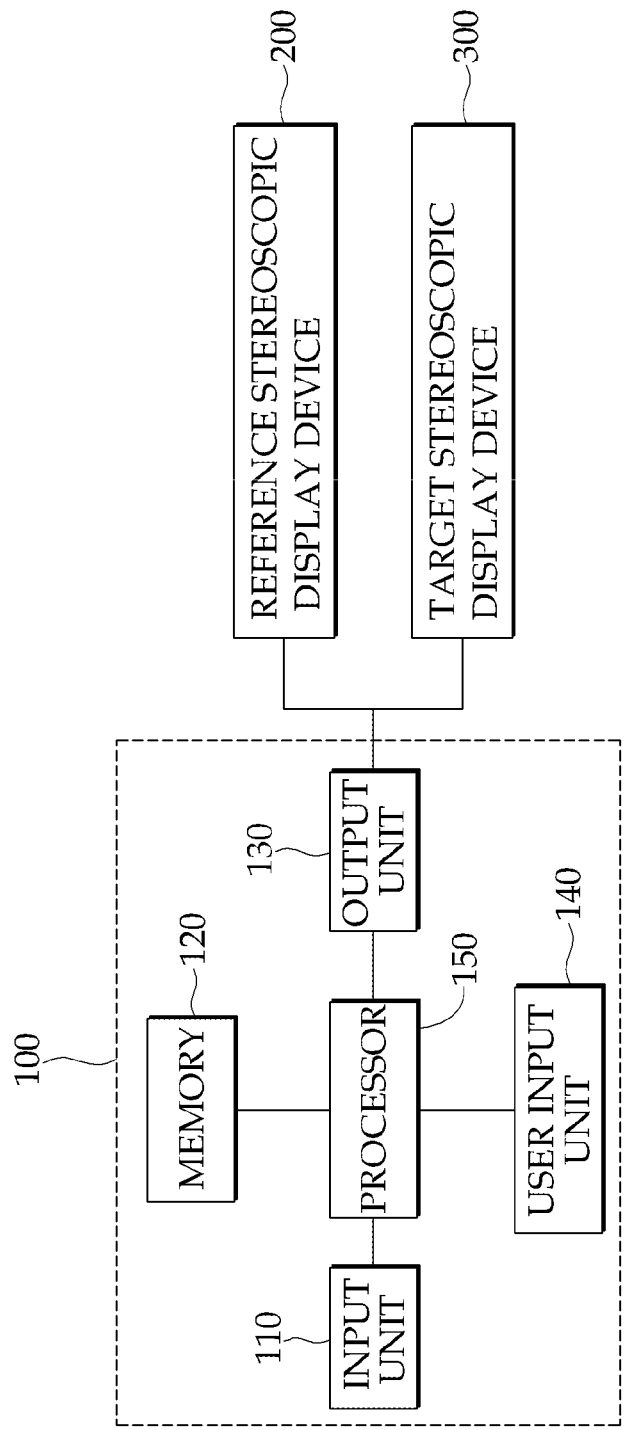
FIG. 2 is a configuration diagram of a color correcting apparatus for color consistency between the stereoscopic display devices according to an exemplary embodiment of the present disclosure.

FIG. 2 illustrates a configuration diagram of a color correcting apparatus for color match between the stereoscopic display devices according to an exemplary embodiment of the present disclosure.

As illustrated in FIG. 2, the color correcting apparatus for color consistency between multiple stereoscopic display devices according to the exemplary embodiment of the present disclosure (hereinafter, referred to as a color correcting apparatus) 100 comprises of an input unit 110, a memory 120, an output unit 130, a user input unit 140, and a processor 150.

The input unit 110 receives images to be output onto a screen of the reference stereoscopic display device 200 and a target stereoscopic display device 300. In other words, the input unit 110 receives images which may be used for color match between the multiple stereoscopic display devices 200 and 300.

The input unit 110 may access the images from the storage unit or receive the images from an external terminal (for example, a camera or a computer) through the wired or wireless communication with the external terminal.

In the memory 120, color profiles of the reference stereoscopic display device 200 and the target stereoscopic display device 300, a reference color chart image and all programs for the operation control of the color correcting apparatus 100 are stored. The memory 120 may be implemented as either an external memory or an embedded memory.

The output unit 130 is an interface that connects the color correcting apparatus 100 with the reference stereoscopic display device 200 and the target stereoscopic display device 300. The output unit 130 outputs an image signal and a control signal output from the color correcting apparatus 100 to the reference stereoscopic display device 200 and/or the target stereoscopic display device 300.

The user input unit 140 serves to receive data for operation control of the color correcting apparatus 100, data for controlling the stereoscopic display devices 200 and 300 a color characteristic adjustment value from a user. The user input unit 140 may be configured by a keyboard, a keypad, a dome switch, or a touch pad (static pressure/electrostatic). When the color matching between the reference stereoscopic display device 200 and the target stereoscopic display device 300 are performed, the color characteristic adjustment values (brightness, chroma, and hue) according to the color measurement using the human visual system are input to the user input unit 140. In other words, the user feedbacks a command instructing the completion of color correction between the stereoscopic display devices 200 and 300.

The user input unit 140 may be formed in a front or one side of the stereoscopic display devices 200 and 300.

The processor 150 converts colors an input image based on the color profile of the stereoscopic display device 200 or 300 and outputs the converted colors to the stereoscopic display device 200 or 300.

The processor 150 corrects the colors of the reference stereoscopic display device 200 using the reference color chart. In this case, the processor 150 converts colors of a reference color chart image using the color profile of the reference stereoscopic display device 200 and outputs the color-converted reference color chart image to the reference stereoscopic display device 200. The processor 150 compares the reference color chart image displayed on the screen of the reference stereoscopic display device 200 with colors of an actual reference color chart and adjusts color characteristics such as brightness, chroma, or hue of the reference stereoscopic display device 200 in accordance with the comparison result. The processor 150 repeats the color correcting operation until the colors of the reference color chart image of the reference stereoscopic display device 200 are consistent with the colors of the actual reference color chart. If the colors of the reference color chart image displayed on the reference stereoscopic display device 200 are consistent with the colors of the actual reference color chart, the processor 150 regenerates the color profile of the reference stereoscopic display device 200 by referring a color characteristic adjustment value set in the reference stereoscopic display device 200. The processor 150 stores the regenerated color profile of the reference stereoscopic display device 200 in the memory 120.

In the meantime, when the color match between the multiple stereoscopic display devices is performed, the processor 150 corrects image colors of the target stereoscopic display device 300 based on the image color which is displayed on the reference stereoscopic display device 200 in accordance with the feedback data input through the user input unit 140. The feedback data includes adjustment values for the brightness, the chroma, and the hue as color characteristic adjustment values in which an image color of the target stereoscopic display device 300 is adjusted with respect to the image color of the reference stereoscopic display device 200 by the user.

If the colors between the reference stereoscopic display device 200 and the target stereoscopic display device 300 are consistent with each other, the processor 150 refers a color characteristic adjustment value set for the target stereoscopic display device 300 to regenerate the color profile of the target stereoscopic display device 300 and store the color profile in the memory 120.

Figure 3:
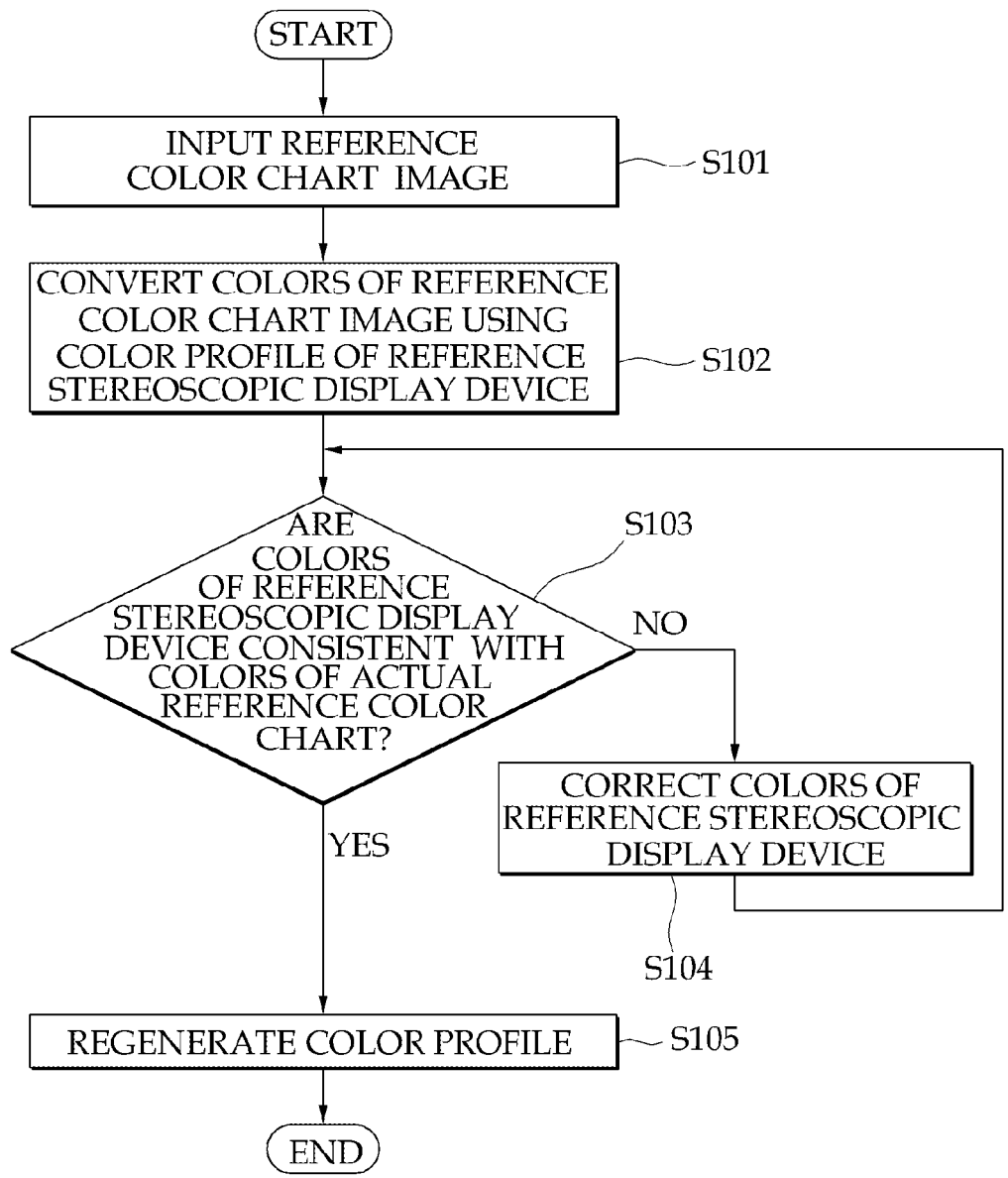
FIG. 3 is a flowchart illustrating a color correcting method of a reference stereoscopic display device of the color correcting apparatus according to an exemplary embodiment of the present disclosure.

FIG. 3 is a flowchart illustrating a color correcting method of a reference stereoscopic display device of the color correcting apparatus according to an exemplary embodiment of the present disclosure. The exemplary embodiment describes a process of correcting colors so that the colors reproduced in a stereoscopic display device are equal to colors of an input image. The stereoscopic display device in which the colors are corrected through the above-mentioned correcting process is used as the reference stereoscopic display device at the time of correcting colors between multiple stereoscopic display devices be consistent.

Referring to FIG. 3, the processor 150 of the color correcting apparatus 100 receives a reference color chart image which will be used to correct colors of the reference stereoscopic display device 200 through the input unit 110 (S101).

The processor 150 converts the colors of the reference color chart image (S102) by use of the color profile of the reference stereoscopic display device 200. The processor 150 outputs the color-converted reference color chart image to the reference stereoscopic display device 200 through the output unit 130.

The processor 150 checks whether the colors of the reference color chart image displayed on the screen of the reference stereoscopic display device 200 are consistent with the colors of the actual reference color chart (S103).

If the colors of the reference color chart image of the reference stereoscopic display device 200 are consistent with the colors of the actual reference color chart, the processor 150 stops color correcting process. Then the processor regenerates color profile by referring the final color characteristic information of the reference stereoscopic display device 200.

In step S103, if the colors of the reference color chart image of the reference stereoscopic display device 200 are not consistent with the colors of the actual reference color chart, the processor 150 corrects the colors of the reference color chart image which is displayed on the reference stereoscopic display device 200 (S104). The processor 150 compares the colors of the reference color chart image which is displayed on the reference stereoscopic display device 200 to the colors of the actual reference color chart and adjusts the color characteristics such as brightness, chroma, and hue of the reference stereoscopic display device 200 in accordance with the comparison result. The processor 150 converts the colors of the reference color chart image in accordance with the color characteristic adjustment value. The processor 150 repeats the above processes until the colors of the reference color chart image of the reference stereoscopic display device 200 are consistent with the colors of the actual reference color chart (S103 to S104).

Figure 4:
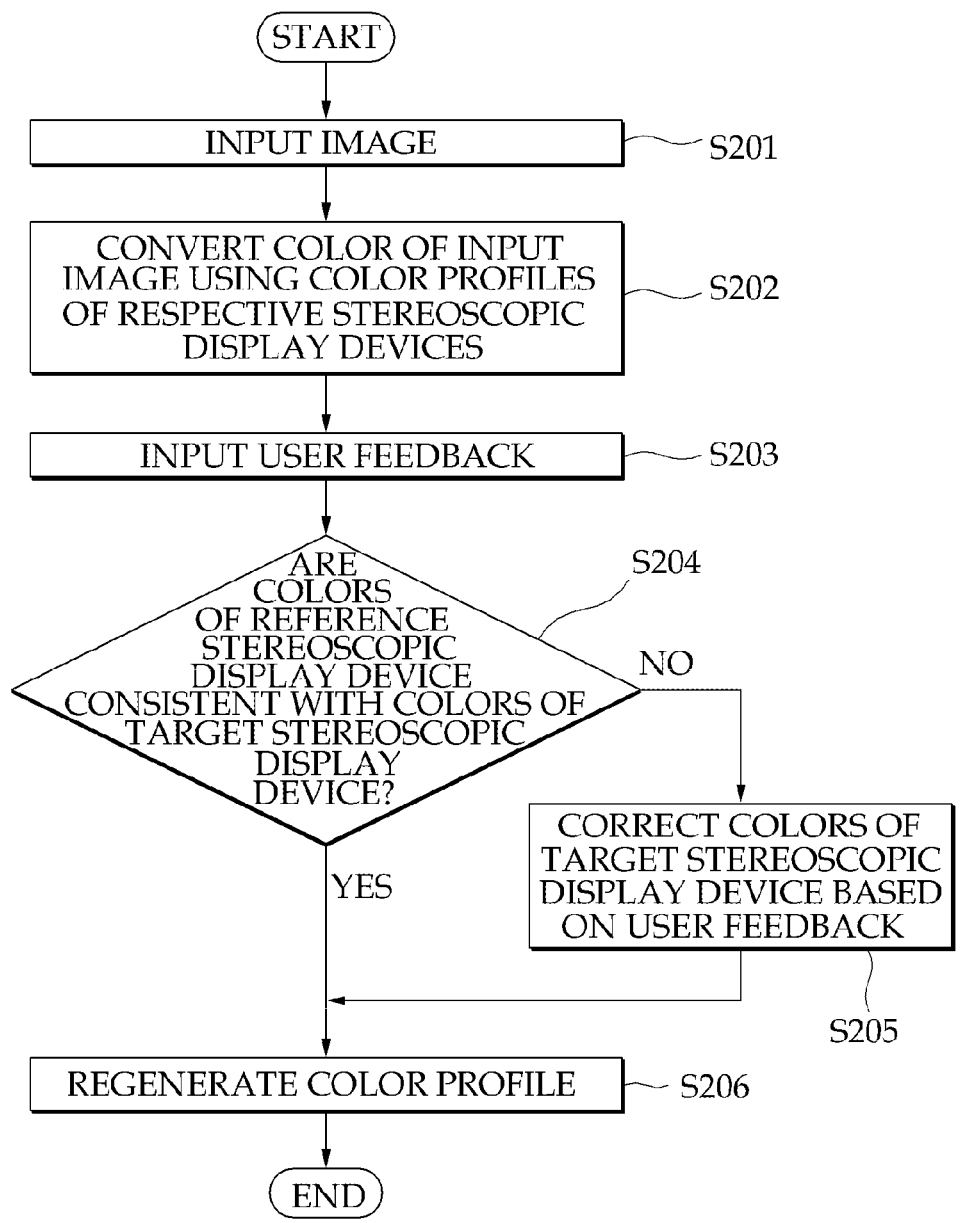
FIG. 4 is a flowchart illustrating a color correcting method for color match between stereoscopic display devices according to an exemplary embodiment of the present disclosure.

FIG. 4 is a flowchart illustrating a color correcting method for color match between stereoscopic display devices according to an exemplary embodiment of the present disclosure. The exemplary embodiment describes the method of color correction of the target stereoscopic display device by referring to the reference stereoscopic display device in which the colors are corrected by the correcting method of FIG. 3.

Referring to FIG. 4, the processor 150 of the color correcting apparatus 100 receives input images which may be used for color match between the multiple stereoscopic display devices 200 and 300 through the input unit 110 (S201).

The processor 150 converts a color signal of the input image based on the color profile of each of the stereoscopic display devices 200 or 300 (S202). In other words, the processor 150 uses the color profile of the reference stereoscopic display device 200 to convert the colors of the input image and then output the color-converted image to the reference stereoscopic display device 200. The processor 150 converts the colors of the input image based on the color profile of the target stereoscopic display device 300 to output the color-converted input image to the target stereoscopic display device 300.

The processor 150 receives feedback data in accordance with the results obtained by visual comparison between the input images reproduced in the reference stereoscopic display device 200 and the target stereoscopic display device 300 the user input unit 140 (S203).

If the image colors of the reference stereoscopic display device 200 and the target stereoscopic display device 300 are consistent as a result of the judgment using the visual comparison of the user, the user inputs a control signal that informs the color match between the stereoscopic display devices as feedback data through the user input unit 140. In the meantime, if the colors of the reference stereoscopic display device 200 are not consistent with the colors of the target stereoscopic display device 300, the user sets a color characteristic adjustment value for adjusting the colors of the target stereoscopic display device 300 based on the colors of the reference stereoscopic display device 200 using visual comparison. If the color characteristic adjustment value is set in accordance with the manipulation of the user, the user input unit 140 transmits the final color characteristic adjustment value to the processor 150.

The processor 150 checks whether the colors of the reference stereoscopic display device 200 are consistent with the colors of the target stereoscopic display device 300 based on the feedback data (S204). If the data (user input) informing the color match between the stereoscopic display devices is received as the feedback data, the processor 150 recognizes that the color match between the reference stereoscopic display device 200 and the target stereoscopic display device 300 is achieved and the process is completed.

In the meantime, if the colors of the reference stereoscopic display device 200 are not consistent with the colors of the target stereoscopic display device 300, the processor 150 converts and corrects the colors of the target stereoscopic display device 300 based on the feedback data input from the user input unit 140 (S205).

The processor 150 refers the converted color characteristics of the target stereoscopic display device 300 in the existing color profile to regenerate the color profile of the target stereoscopic display device 300 (S206).

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A color correcting apparatus for color match between stereoscopic display devices, comprising:
   an input device configured to receive an input image which is used for color match between the stereoscopic display devices;
   a user input device configured to receive feedback data based on the difference in colors of images displayed on a reference stereoscopic display device and a target stereoscopic display device;
   a processor configured to convert colors of the input image using color profiles of the reference stereoscopic display device and the target stereoscopic display device and correct colors of an image displayed on the target stereoscopic display device based on the feedback data to be matched with colors of an image displayed on the reference stereoscopic display device; and
   an output device configured to output the color-converted input images to the reference stereoscopic display device and the target stereoscopic display device so that the reference stereoscopic display device and the target stereoscopic display device display the color-converted input images,
   wherein the precessor regenerates the color profile of the target stereoscopic display device based on the feedback data if the colors of the image displayed on the reference stereoscopic display device are matched with the colors of the image displayed on the target stereoscopic display device.

2. The color correcting apparatus of claim 1, wherein the feedback data includes values for adjusting color characteristics, such as brightness, chroma, and hue, of the target stereoscopic display device.

3. The color correcting apparatus of claim 1, wherein the processor corrects the colors of the image displayed on the reference stereoscopic display data using a reference color chart.

4. The color correcting apparatus of claim 3, wherein, when the processor converts the colors of the input image based on the color profile of the reference stereoscopic display device and outputs the color-converted image to the reference stereoscopic display device, the processor compares a reference color chart of the image displayed on the reference stereoscopic display device to a reference color chart of the input image, and corrects the colors of the image displayed on the reference stereoscopic display device until the colors of the image displayed on the reference stereoscopic display device are matched with the colors of the input image.

5. A color correcting method for color match between stereoscopic display devices, the method comprising:
   converting colors of an input image using color profiles of a reference stereoscopic display device and a target stereoscopic display device;
   receiving feedback data based on the difference in colors of images displayed on the reference stereoscopic display device and the target stereoscopic display device;
   checking the color match between the images displayed on the reference stereoscopic display device and the target stereoscopic display device;
   correcting the colors of the image displayed on the target stereoscopic display device based on the feedback data if the colors of the image displayed on the reference stereoscopic display device are not matched with the colors of the image displayed on the target stereoscopic display device; and
   regenerating the color profile of the target stereoscopic display device based on the feedback data if the colors of the image displayed on the reference stereoscopic display device are matched with the colors of the image displayed on the target stereoscopic display device as a result of the correcting.

6. The color correcting method of claim 5, wherein the color profiles are generated based on data for color characteristics of the reference stereoscopic display device and the target stereoscopic display device, the data being measured by a spectrophotometer.

7. The color correcting method of claim 6, wherein the data is a value on a CIEXYZ color space or a CIELAB color space.

8. The color correcting method of claim 5, wherein receiving the feedback data includes receiving values for adjusting color characteristics, such as brightness, chroma, and hue, of the target stereoscopic display device.

* * * * *